United States Patent

Eilers

[11] 4,193,581
[45] Mar. 18, 1980

[54] CAGE FOR GATE VALVES AND METHOD OF ASSEMBLY

[75] Inventor: Barney A. Eilers, Missouri City, Tex.

[73] Assignee: ACF Industries, Incorporated, New York, N.Y.

[21] Appl. No.: 917,037

[22] Filed: Jun. 19, 1978

[51] Int. Cl.² .............................................. F16K 3/00
[52] U.S. Cl. ....................................... 251/328; 251/167
[58] Field of Search ......................... 251/328, 167, 196

[56] References Cited

U.S. PATENT DOCUMENTS

| | | | |
|---|---|---|---|
| 2,504,924 | 4/1950 | Fennema | 251/167 |
| 2,906,491 | 9/1959 | Young | 251/167 |
| 2,985,189 | 5/1961 | Dickinson | 251/167 X |
| 3,743,244 | 7/1973 | Dickinson | 251/328 X |
| 3,823,911 | 4/1974 | Natho | 251/196 X |
| 4,116,419 | 9/1978 | Diehl | 251/328 X |

Primary Examiner—Harold W. Weakley
Attorney, Agent, or Firm—Eugene N. Riddle

[57] ABSTRACT

A gate valve structure has a one-piece cage (76) in the form of an open ended sleeve which fits in the valve chamber of the body. The cage includes a pair of openings (82) which are aligned with the inlet and outlet flow passages in the body. Seats (60, 62) are mounted within the openings of the cage and have outwardly extending lugs (66) which are received within slots (88) in flanges (86) about openings (82) in the cage. The flanges (86) limit the inward movement of the seats toward the gate assembly and maintain a predetermined minimum spacing between the seats to minimize binding of the seats against the gate. The seats are easily inserted within the openings of the cage after the cage is fitted within the valve body.

4 Claims, 5 Drawing Figures

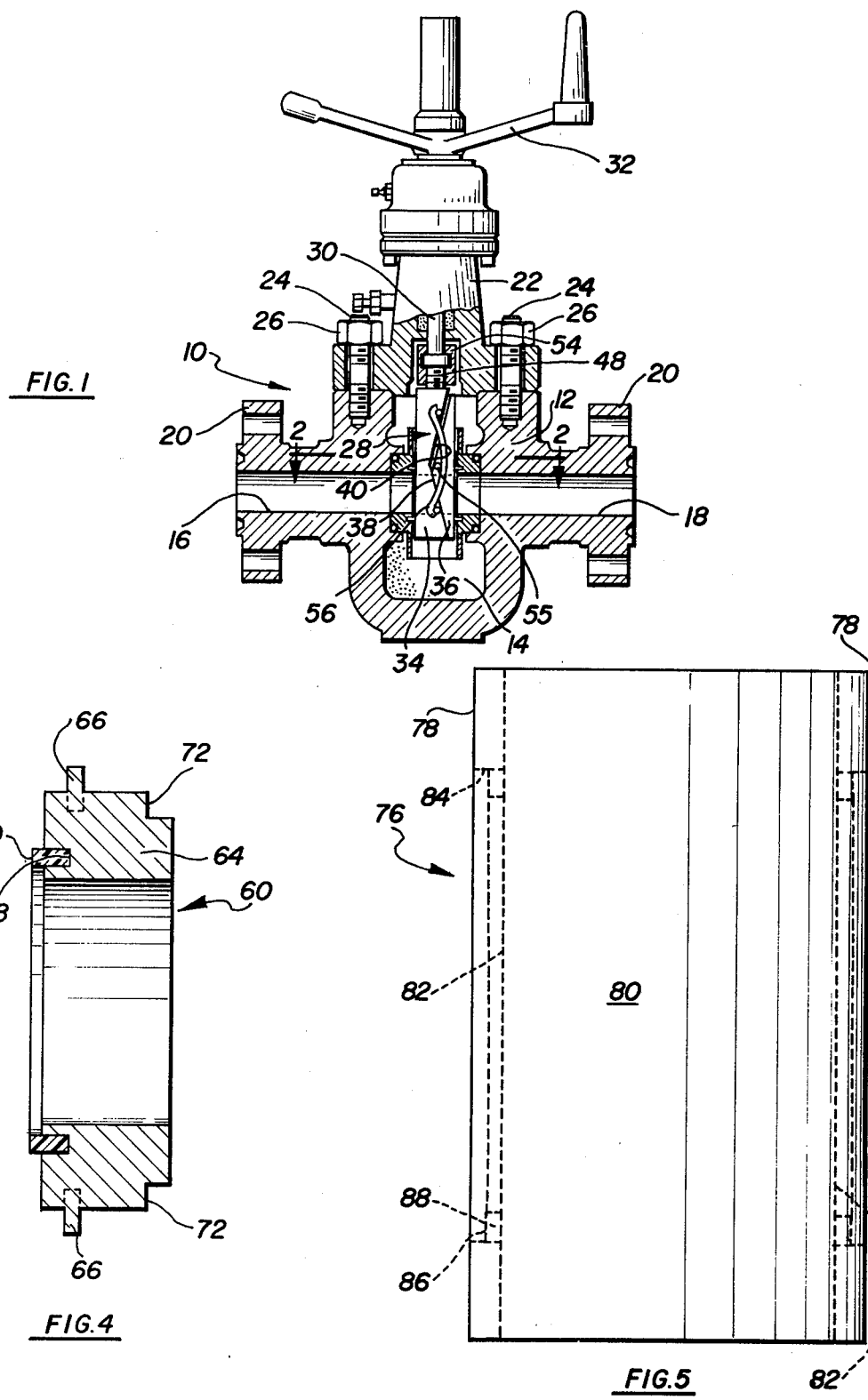

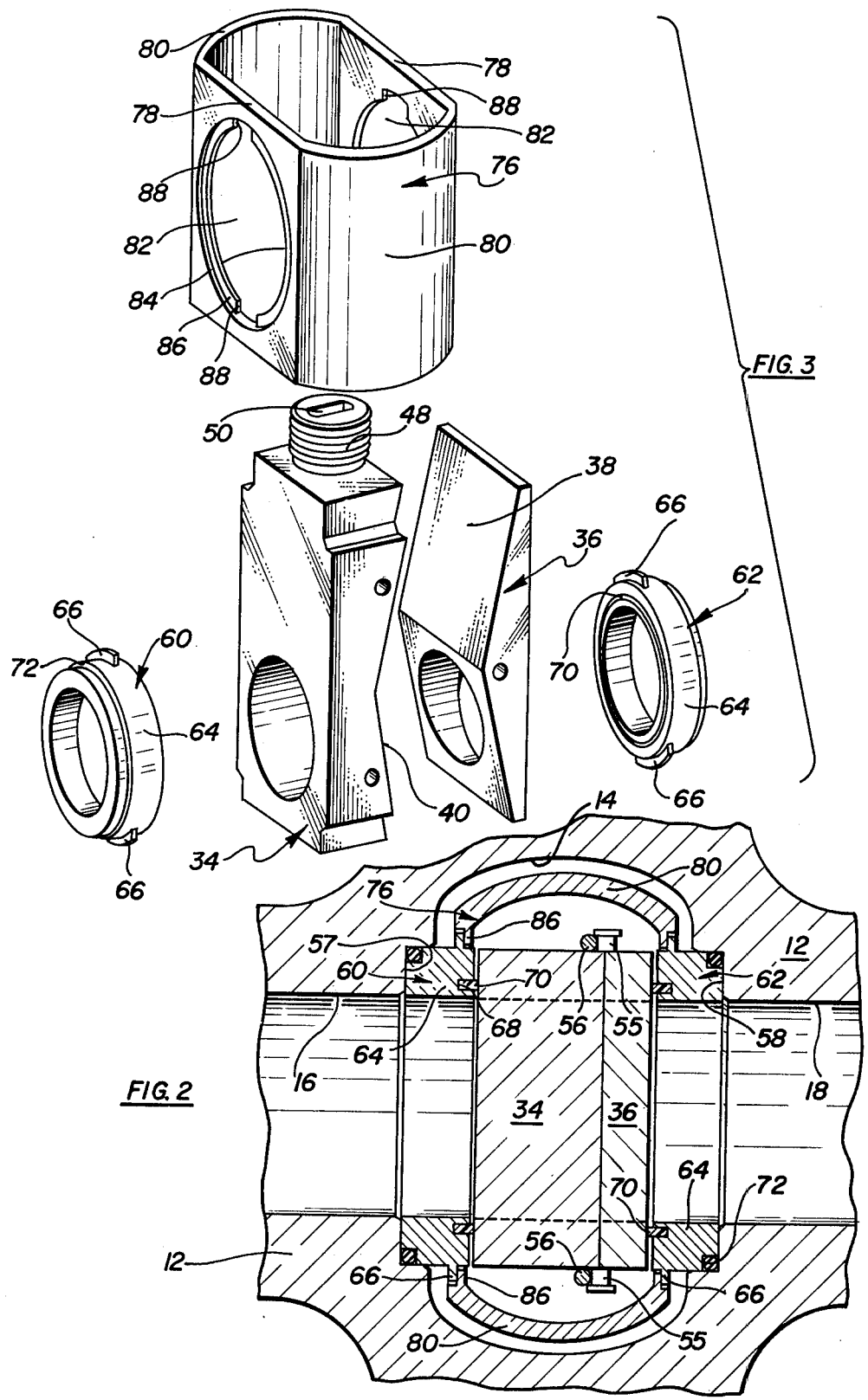

CAGE FOR GATE VALVES AND METHOD OF ASSEMBLY

BACKGROUND OF THE INVENTION

This invention relates to gate valve structures and more particularly to gate valves having an expanding gate assembly formed of two portions which expand outwardly from each other at open and closed positions to provide a fluid-tight seal with the adjacent face seals.

Normally floating seat assemblies are mounted within recesses of the valve body on opposite sides of the gate structure and fluid under pressure may enter recesses behind the seat assemblies to cause the seat assemblies to move or float toward the gate assembly. In the event the upstream seat assembly is subjected to a high differential pressure when the fluid pressure in the adjacent flow passage is substantially higher than the fluid pressure in the valve body, then the upstream seat assembly will "float" or move toward the gate assembly especially in the closed position of the gate assembly thereby to cause sticking or binding of the gate assembly when the gate assembly is initially moved from the fully closed position toward the open position.

As shown in U.S. Pat. No. 3,823,911 dated July 16, 1974, spacers are provided between floating seats in an expanding gate valve structure to limit the movement of the seats toward the gate valve assembly. This arrangement provides a minimum clearance between the seats at all times and has been effective to minimize the seat assemblies from binding against the gate assembly in a fully closed, collapsed position such as might occur when the upstream seat is subjected to a relatively high differential pressure.

DESCRIPTION OF THE PRESENT INVENTION

The present invention is directed to a gate valve structure having an expanding gate assembly formed of a gate and element carried thereby, with the adjacent seat being spaced from each other a predetermined minimum clearance at all times in order to minimize any binding or sticking of the seats against the gate assembly. The present invention utilizes a one-piece cage or open ended sleeve which fits within the valve chamber of the valve body and has openings therein to receive the seats. The one-piece cage receives the gate assembly and limits the movement of the seats toward the gate assembly.

The one-piece open ended sleeve permits a simple and quick method for mounting the seats within the valve body. With the valve bonnet removed, the one-piece cage may be easily inserted within the valve chamber. After the sleeve has been inserted, the seats may then be inserted within opposed openings in the cage and secured by a bayonet-type lug arrangement. After the seats have been assembled, then the gate assembly may be inserted within the open end of the cage. The lugs on the seats engage adjacent flanges or abutments on the cage to limit the floating movement of the seats toward the gate assembly thereby minimizing any binding or sticking of the seats against the gate assembly. Thus, the floating movement of the seats is controlled by the one-piece cage construction.

BRIEF DESCRIPTION OF THE DRAWINGS

In the accompanying drawings, in which one of various possible embodiments of the invention is illustrated;

FIG. 1 is a sectional view, certain parts shown in elevation, of a gate valve structure embodying the present invention;

FIG. 2 is a section taken generally along the line 2—2 of FIG. 1 and showing the cage within the valve chamber and the seat assemblies in position within the cage;

FIG. 3 is an exploded view of the cage, seats, and gate assembly;

FIG. 4 is a side elevation of a seat assembly removed from the gate valve structure; and FIG. 5 is a side elevation of the cage removed from the gate valve assembly.

Referring now to the drawings for a better understanding of the invention, a gate valve structure is generally indicated at 10 and includes a valve body generally designated at 12 having a valve chamber 14 therein. Inlet flow passage 16 and outlet flow passage 18 communicate with valve chamber 14. Flanges 20 on the ends of valve body 12 may be suitably connected to a connecting pipeline or other flow system as is well known in the art. A bonnet 22 is connected by studs 24 and nuts 26 to the upper end of body 12.

A gate valve assembly generally indicated at 28 is mounted within chamber 14 for movement between open and closed positions relative to the flow passages 16 and 18. A valve stem 30 is connected to gate assembly 28 and handwheel 32 is operably connected to valve stem 30 for moving gate assembly 28 between closed and open positions upon rotation of handwheel 32 as is well known in the art.

Gate assembly 28 includes a gate 34 and a segment 36 carried by gate 34. Gate 34 and segment 36 are of complementary shape, segment 36 having a V-shaped face 38 while gate 34 has a face 40 adapted to fit the V-shaped face 38 of segment 36 and upon relative longitudinal movement between gate 34 and segment 36 to expand gate assembly 28 outwardly. Gate 34 and segment 36 have suitable ports to align with flow passages 16 and 18 in an open position of gate assembly 28. Gate 34 has a threaded projection 48 with an elongate slot 50 therein. Stem 30 has a complementary lug fitting within slot 50. An internally threaded nut 54 is threaded on projection 48 to connect stem 30 to gate 34 for longitudinal movement. Lugs 55 extend from opposed sides of gate 34 and segment 36, and springs 56 engage lugs 55 to urge gate 34 and segment 36 to a collapsed or retracted position.

Formed in valve body 12 adjacent valve chamber 14 are annular recesses 57 and 58 which extend about respective flow passages 16 and 18. Upstream and downstream seats 60 and 62 are mounted within respective recesses 57 and 58 and are generally identical. Seat 60 will be explained for the purposes of illustration, it being understood that seat 62 is identical with similar numerals indicating similar parts. Seat 60 includes a metal seat ring 64 having a pair of opposed lugs 66 extending from the outer surface therof. Seat ring 64 has an annular groove 68 therein and a face seal 70, formed for example of polytetrafluoroethylene is pressed within groove 68 for engaging the adjacent face of gate assembly 28. Ring 64 has an outer periphery which is stepped at 72. If desired, a suitable spring may be provided to urge seat 60 outwardly toward the gate assembly. For example, an O-ring could be inserted within stepped portion 72 to urge seat 60 toward gate 34.

To maintain seats 60 and 62 in a minimum spaced relation to each other, a cage or open ended sleeve is provided and indicated generally by the numeral 76.

Cage 76 has a pair of generally parallel spaced sides 78 connected by integral ends 80 of an arcuate curvature to define generally a tubular shape. Each side 78 has a central opening 82 therein which is in axial alignment with flow passages 16 and 18. Each opening 82 defines a circumferential surface 84 having a flange 86 extending therefrom. Flange 86 has a pair of opposed slots 88 formed therein of a width to receive lugs 66. To position seats 60 and 62, sleeve or cage 76 with bonnet 22 removed is first positioned within valve chamber 14. Then, seat 60 is manually inserted from the open end of cage 76 and lugs 66 are aligned with slots 88 to permit insertion of seat 60 with opening 82. Seat 60 is rotated so that lugs 66 are in abutting relation with the associated flange 86 which limits the inward movement of seat 60. Seat 62 is then inserted within opening 82 in a similar manner. Then, gate assembly 28 is inserted within sleeve 76 between seats 60 and 62.

In a closed position of gate assembly 28, segment 36 is urged outwardly so that gate 34 and segment 36 expand to form a tight sealing relationship against face seals 70 of seats 60 and 62. In the event a high fluid pressure differential exists, the upstream fluid pressure in recess 57 behind seat 60 will urge seat 60 into fluid-tight engagement with the adjacent face of gate 34. However, lugs 66 in engagement with flange 86 limit the inward movement of seat 60. Likewise, the inward movement of seat 62 is limited by flange 86 about opening 82. Thus, a minimum clearance is provided between seats 60 and 62 at all times by cage 76. When gate assembly 28 is moved initially from a fully closed position which is the position at which the maximum torque is required for movement of gate assembly 28 between open and closed positions, gate 34 initially moves relative to segment 36 for movement of the gate assembly to a collapsed or retracted condition. Even though a relatively high fluid pressure urges seat 60 toward gate 34, flanges 86 by controlling the inward movement of seats 60 and 62 minimize the binding or sticking of gate 34 against seat 60 and permits the initial "cracking" of gate assembly 28 from the fully closed position with a minimum of torque.

By providing a sleeve or open ended cage 76 which is easily inserted in the valve chamber, seats 60 and 62 may be easily positioned upon assembly of the valve structure in a minimum of time. While seats 60 and 62 may be freely floating seats, it may be desirable to provide seats which are press fitted within recesses 57 and 58. Even though the seats may be pressed in recesses 57 and 58, a high pressure differential between the body chamber and flow passages may result in fluid pressure behind the seats moving the seats longitudinally.

What is claimed is:

1. A gate valve structure comprising:
   a valve body having a valve chamber therein and axially aligned inlet and outlet flow passages communicating with the valve chamber;
   a bonnet connected to an upper end of the valve body;
   an open-ended cage received within the valve chamber, said cage having a pair of generally parallel sides spaced by ends extending between the sides, said sides each having an opening therein in alignment with said flow passages;
   an expanding gate assembly mounted within the cage closely adjacent the generally parallel sides for movement between open and closed positions relative to the flow passages;
   and an annular seat within each opening around the adjacent flow passage and having a face seal for sealing against the gate assembly, said seats being mounted for limited longitudinal movement relative to the cage, said cage having means to stop the inward movement of the seats to maintain a predetermined minimum clearance between the seats.

2. A gate valve structure as set forth in claim 2 wherein the seats are removably connected to the cage about the openings therein.

3. A gate valve structure comprising:
   a valve body having a valve chamber therein and axially aligned inlet and outlet flow passages communicating with the valve chamber;
   a bonnet removably connected to an upper end of the valve body;
   a one-piece open-ended sleeve received within the valve chamber, said sleeve having a pair of generally parallel sides connected by integral ends, said sides each having an opening therein in alignment with said flow passages;
   an expanding gate assembly mounted within the sleeve closely adjacent the generally parallel sides for movement between open and closed positions relative to the flow passages;
   an annular seat within the opening around each of the flow passages and having a face seal for sealing against the gate assembly, said seats being mounted or floating longitudinal movement relative to the sleeve;
   and stop means on the sleeve adjacent each opening therein to stop the inward movement of the adjacent seat to maintain a predetermined minimum clearance between the seats.

4. A gate valve structure as set forth in claim 3 wherein each of said seats has at least two lugs extending from the outer circumference thereof, and said sleeve has a pair of slots therein adjacent each opening to receive the lugs.

* * * * *